Feb. 13, 1962   L. FELDMAN   3,020,702
TIMEPIECE MOVEMENT
Filed Sept. 2, 1958
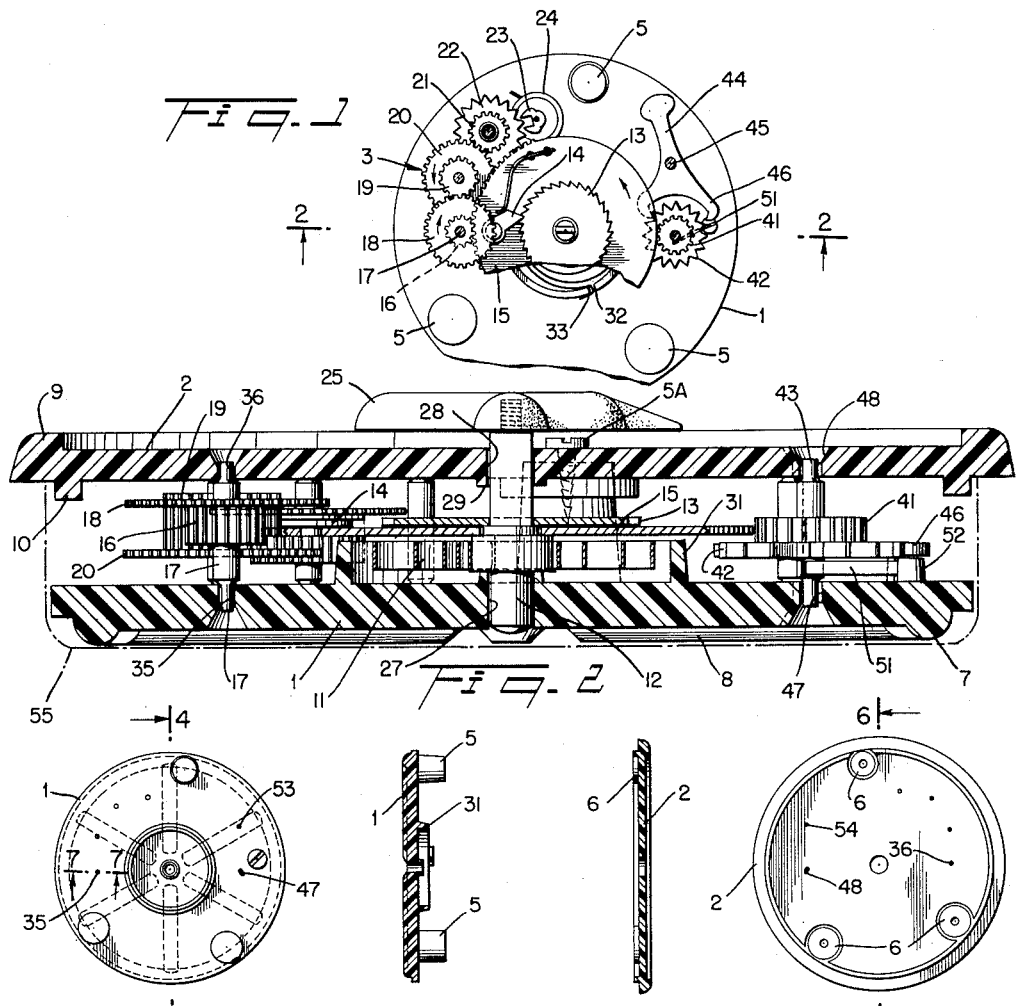
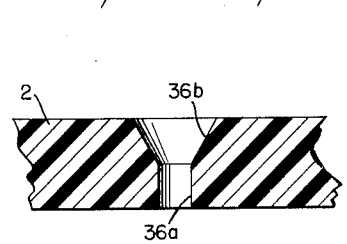
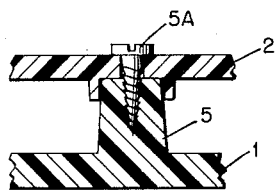
INVENTOR.
LAWRENCE FELDMAN
BY *Robert E. Burns*
ATTORNEY 3,020,702
TIMEPIECE MOVEMENT
Lawrence Feldman, Balderas 90, Mexico 1 DF,
Mexico City, Mexico
Filed Sept. 2, 1958, Ser. No. 758,386
2 Claims. (Cl. 58—52)

The present invention relates to clocks, timers and other timepieces and in particular to portable timepieces, the term portable being herein used to designate timepieces which are customarily worn or carried on the person.

In a clock, watch or other timepiece the escapement mechanism and gear train comprising the movement or "works" is usually housed between two plates which are formed of brass or other metal and provided with bearings for rotatably supporting the shafts or pivots of the several wheels of the works. The plates are customarily stamped from sheet metal and are punched or drilled to provide holes in which jewel or other bearings are individually fitted.

The present invention represents an important improvement over the conventional construction of timepieces. In accordance with the invention, the plates which house and support the works are molded of a plastic material having the characteristics of toughness, strength, shock resistance, dimensional stability over a wide range of temperatures, low coefficient of friction and high resistance to abrasion. A long-chain polymeric amide which has recurring amide groups as an integral part of the main polymer chain, such as that designated by the term "nylon," has been found satisfactory for this purpose. At least one of the plates is provided with integrally molded projecting portions which interfit with mating portions of the other plate to position the two plates in predetermined spaced relation and accurate orientation relative to one another. The plates are provided with bearing holes located in precise position relative to one another so that a bearing hole in one plate is accurately aligned with a bearing hole in the other plate. These holes are preferably provided in the molding operation. The aligned holes provided in the plates provide bearings for the pivots of the works. The pivots bear directly in the holes so that individual jewel or other bearings are unnecessary. By reason of the low coefficient of friction and high abrasion resistance of the plastic material forming the plates, the holes provide low friction bearings for the pivots. At least one of the molded plates is preferably also provided with an integral projecting flange portion which provides a housing or barrel for the main spring of the movement. Any posts or other projecting portions needed to support elements of the movement are likewise readily and economically provided merely by molding them integrally with one or another of the plates.

The novel construction in accordance with the invention makes it possible to manufacture timepieces more economically while at the same time maintaining high quality standards. The molded plastic plates not only facilitate manufacture of the timepiece but have the further advantages that they are lighter in weight than conventional metal plates and also improve resistance to shock since the plastic plates tend to cushion the movement.

Other characteristics and advantages of the construction in the present invention will be understood from the following description and claims in conjunction with the accompanying drawings which show by way of example a timepiece movement embodying the invention.

In the drawings:

FIG. 1 is a plan of a timepiece movement in accordance with the invention, one of the plates being removed and one of the gear wheels being broken away to show parts lying underneath.

FIG. 2 is an enlarged cross section of a timepiece movement in accordance with the invention, the section being taken approximately on the line 2—2 in FIG. 1.

FIG. 3 is an inside plan of one of the plates herein designated as the bottom plate.

FIG. 4 is a cross section taken approximately on the line 4—4 in FIG. 3.

FIG. 5 is an inside plan of the other plate herein designated as the top plate, it being understood that the designations "top" and "bottom" are used for convenience of identification and without any limitation as to the position of the timepiece.

FIG. 6 is a cross section taken approximately on the line 6—6 in FIG. 5.

FIG. 7 is an enlarged fragmentary view showing a bearing hole in one of the plates.

FIG. 8 is an enlarged fragmentary section showing how a post on one of the plates fits into a socket in the other plate so as to position and orient the two plates.

The timepiece movement shown by way of example in the drawings comprises a lower plate 1, an upper plate 2 and a train 3 disposed between the two plates. The lower plate 1 and upper plate 2 are molded of plastic material having the characteristics of toughness, strength, shock resistance, dimensional stability over a wide range of temperatures, low coefficient of friction and high abrasion resistance. A suitable plastic material is nylon. The term "nylon" is herein used as a generic term for any long-chain polymeric amide which has recurring amide groups as an integral part of the main polymer chain. In addition to the characteristics noted above, nylon has a low specific gravity, good resistance to chemicals and solvents, good dielectric properties and resistance to heat. It is easily molded to accurate dimensions. The plates 1 and 2 are hence readily molded either by injection or pressure molding.

In the drawings, the lower plate 1 is provided with a plurality of upwardly projecting posts 5, three such posts being shown. The upper plate 2 is formed on its lower face with corresponding sockets 6 which receive and fit accurately on the upper ends of the posts 5. The sockets 6 are shown as being defined by downwardly projecting circular flanges provided on the lower face of the upper plate 2. The post 5 and corresponding socket 6 are located near the peripheries of the plates and are circumferentially spaced so as to be distributed around the circumference. The arrangement of the posts is preferably asymmetrical so that the plates can be fitted together in only one position relative to one another. As shown in the drawing, two of the posts are closer together and the third post is of a smaller diameter. Means is provided for securing the plates 1 and 2 in assembled position. For example the upper plate 2 may be molded or adhesively secured to the posts 5. When it is desired to provide for disassembly of the movement the plates are secured together by releasable fittings illustrated as self tapping screws 5A screwed into holes in the posts 5.

The lower plate 1 is shown provided with a downwardly projecting peripheral bead or rim 7 and a plurality of circumferentially spaced radially extending ribs 8 which at their outer ends merge into the bead 7. The bead and connecting ribs strengthen and stiffen the lower plate without materially increasing the weight of the plate or the material required in molding it. The upper plate 2 is provided on its upper face with a peripheral bead or rim 9 and on its lower face with an annular rib 10 which is spaced slightly inwardly from the periphery of the plate being located approximately below the inner edge of the bead 9. As will be described more fully below, the molded plastic plates 1 and 2 are provided with integral configurations for receiving or supporting parts of a timepiece movement and with aligned holes which receive and rotatably support various shafts and pivots of the movement.

The movement shown by way of example in the drawings comprises a spiral main spring 11, the inner end of which is secured to a rotatable barrel arbor 12. A ratchet wheel 13 fixed on the barrel arbor 12 is engaged by a spring pressed pawl 14 which is pivotally mounted on a gear wheel 15 which is rotatable on the barrel arbor. The pawl and ratchet thus provides a driving connection between the wheel 15 and the arbor 12. The wheel 15 is provided with gear teeth on part of its circumference, for example about one half, the remainder being reduced to the root diameter of the gear. The teeth on wheel 15 engage a pinion 16 on a shaft or pivot 17 which also carries a gear wheel 18. The movement further comprises a pinion 19, wheel 20, pinion 21, and a suitable escapement mechanism illustrated as an escapement wheel 22 fixed on the same pivot as pinion 21, a pawl 23 and balance wheel 24. A hand or pointer 25 is fixed on a projecting end portion of the barrel arbor 12.

The barrel arbor 12 extends through aligned holes 27 and 28 in the molded plastic plates 1 and 2 and is rotatably supported by engagement with the plastic material surrounding the holes. By reason of its low coefficient of friction and high resistance to abrasion, the plastic material provides a good bearing surface making it unnecessary to insert jewel or other bearings for the arbor. The upper plate 2 is shown provided with a rim or flange 29 surrounding the hole 28 to increase the bearing area. On the upper or inner surface of the lower plate 1, there is provided an upstanding circular flange 31 which is concentric with the hole 27 provided for the barrel arbor and defines a chamber or barrel to receive the main spring 11. The outer end of the main spring is suitably anchored for example by providing a slit or gap 32 in the flange 31 and forming a hook 33 on the end of the spring to hook over the flange at one side of the gap. Aligned holes 35 and 36 are provided in the plastic plates 1 and 2 to receive the pivot 17 of the wheel 18 and thereby rotatably support the pivot. As shown in FIG. 7 each of the holes preferably comprises a cylindrical bearing surface 36a which is engaged by the pivot and a tapered or conical portion 36b which provides a recess to receive oil for lubrication of the pivot. Similar bearing holes are provided in the plates for the pivots of wheel 20, escapement wheel 22 and balance wheel 24. The bearing holes may, if desired, be surrounded by rims like the rim 29 around the hole 28. While the bearing holes in the plates can, if desired, be drilled after the plates are molded, it is desirable to reduce production cost by providing suitable pins in the mold so that the holes are formed in the molding operation. By reason of the accurate molding properties and dimensional stability of the material forming the plates, the bearing holes can be formed with the required precision in the molding operation. Moreover, since the interfitting portions 5 and 6 of the plates assure accurate positioning and orientation of the plates relative to one another, correct alignment of the bearing holes is assured. As the space between the two plates is open at its periphery except for the spaced posts 5, access is provided so that the pivots can be lined up properly to fit into the bearing holes when the movement is being assembled.

The movement is further shown as including an alarm mechanism comprising a pinion 41 and ratchet wheel 42 fixed on a pivot 43 and a hammer 44 oscillatable about a pivot 45 and having pawls 46 engaging the teeth of the ratchet wheel 42. The pivot 43 is rotatably supported by being received in holes 47 and 48 provided in the plastic plates 1 and 2. As will be seen in FIGS. 3 and 5, these holes are elongated and have their longitudinal axis inclined with respect to a radius of the plates passing through the holes. The elongation of the holes 47 and 48 permits slight lateral movement of the pivot 43 to assure proper meshing of the pinion 41 with the teeth on wheel 15 and avoid the possibility of jamming. The pinion 41 is pressed into engagement with the wheel 15 by a small light leaf spring 51 which has one end anchored in a slotted post 52 molded integrally with the lower plate 1 while the other end of the spring bears on the pivot 43. The pivot 45 of the hammer 44 is rotatably supported by being received in aligned holes 53 and 54 provided in the plates 1 and 2.

The movement is suitably enclosed by being inserted in a cup-shaped casing 55 having a bottom wall and side wall. The lower plate 1 and the rib 10 of the upper plate 2 fit snugly in the casing while the peripheral portion of the upper plate seats on the upper edge of the side wall. The upper plate 2 thus constitutes a cover for the case.

The timing mechanism shown by way of example in the drawings is operated by turning the pointer 25 in a clockwise direction from the zero point to a selected point corresponding to the time interval desired, suitable calibrations being provided on the upper face of the upper plate 2 or on a suitable dial superposed on the plate. This movement of the pointer serves to wind the main spring 11, the inner end of which is fixed to the barrel arbor 12. The pointer is then released and is rotated in a counterclockwise direction by the main spring under control of the escapement mechanism. The teeth provided on the periphery of the wheel 15 are so positioned that when the zero point is reached, the teeth run off of the pinion 16 and at approximately the same time the opposite end of the toothed portion engages the pinion 41 of the alarm mechanism. As the wheel 15 is no longer under control of the escapement mechanism, it turns more rapidly so that the ratchet wheel 42 is rapidly revolved to oscillate the hammer 44 which is preferably positioned so as to strike the side wall of the casing.

It will be understood that the train escapement mechanism and alarm mechanism illustrated in the drawings is shown and described merely by way of example and that any suitable mechanism might be used. To accommodate different mechanisms, the plates 1 and 2 are suitably molded to provide the required holes in proper position for bearings and also such other projections or supports as are necessary for the mechanism. By thus making not only the bearings for the pivots but also posts, flanges, supports, etc., integral with the plates 1 and 2 and by forming them in the molding process, substantial economies in cost of production can be effected.

What I claim and desire to secure by Letters Patent is:

1. In a timepiece having a cup-shaped case with a back wall portion and a cylindrical side wall portion having a front edge, two thin flat plates of molded plastic material having the characteristics of a low coefficient of friction, high abrasion resistance, elasticity, toughness, shock resistance and strength over a wide range of temperature, said plates being superposed in parallel spaced relation with inner surfaces facing one another and comprising a front plate and a back plate, one plate only having three integrally molded projecting posts extending axially from its inner face and asymmetrically arranged around the circumference of said one plate and the other plate having in its inner face matching recesses receiving and fitting the ends of said posts, securing means cooperating with said posts and the engaging portions of said other plate to secure said two plates together in assembled spaced relationship, said plates having aligned bearing holes extending through the plates, a timepiece movement comprising a plurality of parallel pivots assembled between the two plates, each said pivot having oppositely disposed ends journaled respectively in aligned holes of said plates and at least some of said pivots having shoulders engaging the inner surfaces of said plates to position said pivots axially, said back plate being of a size to fit in said case and having on its outer surface a peripheral rim and said front plate being larger and having a peripheral portion seating on the front edge of said side wall of the case and an annular flange on the inner surface of said front plate fitting into said case, said plates thereby providing a resilient shock-resisting mounting of said movement in said case.

2. A main spring operated timepiece comprising two plates, each plate having two oppositely disposed sides and being of molded plastic material having characteristics of a low coefficient of friction, toughness, strength and dimensional stability over a wide range of temperature, one plate only having a plurality of integrally molded projecting posts extending axially from one side of said one plate and asymmetrically arranged around the circumference of said one side of said one plate, and the other plate having a plurality of asymmetric recesses extending axially in one side of said other plate and asymmetrically arranged around the circumference of said side of said other plate complementary to said projecting posts of said one plate for interfitting therewith to position said plates in opposite spaced relation and in only one orientation relative to each other, and each said plate defining an equal plurality of bearing holes, the bearing holes of one plate being respectively opposite the bearing holes of the other plate when said posts interfit with said recesses; a timepiece movement having a main spring and a plurality of parallel pivots assembled between said plates, each said pivot having oppositely disposed ends journaled respectively in said opposite bearing holes of the opposed plates for supporting the movement in mechanically operable assembly; and securing means cooperating with said posts for fastening said posts of one said plate in said complementary recesses of said other plate thereby fastening together said plates and holding said movement by the direct engagement of said pivots in said bearing holes operably assembled between said plates, one of said plates having a center bearing hole and an integral annular flange surrounding and spaced from said center bearing hole and extending axially from one side of said plate toward the other plate, to house said main spring.

References Cited in the file of this patent

UNITED STATES PATENTS

| | | |
|---|---|---|
| 922,197 | Sandoz | May 18, 1909 |
| 1,524,178 | Hildebrand | Jan. 27, 1925 |
| 2,004,909 | Benson | June 11, 1935 |
| 2,013,208 | Hammond | Sept. 3, 1935 |
| 2,063,976 | Bateholts | Dec. 15, 1936 |
| 2,346,572 | Goodwin | Apr. 11, 1944 |
| 2,459,598 | Scott | Jan. 18, 1949 |
| 2,510,583 | Johnson et al. | June 6, 1950 |
| 2,828,649 | Boerdyk et al. | Apr. 1, 1958 |

FOREIGN PATENTS

| | | |
|---|---|---|
| 545,996 | France | Aug. 7, 1922 |